(12) United States Patent
Sarferaz

(10) Patent No.: US 12,354,046 B2
(45) Date of Patent: Jul. 8, 2025

(54) ARTIFICIAL INTELLIGENCE SUPPORT IN ERP SYSTEMS

(71) Applicant: SAP SE, Walldorf (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 18/453,034

(22) Filed: Aug. 21, 2023

(65) Prior Publication Data

US 2025/0069019 A1   Feb. 27, 2025

(51) Int. Cl.
*G06Q 10/0639* (2023.01)

(52) U.S. Cl.
CPC ............... *G06Q 10/06395* (2013.01)

(58) Field of Classification Search
None
See application file for complete search history.

(56) References Cited

U.S. PATENT DOCUMENTS

| | | | | |
|---|---|---|---|---|
| 10,163,061 | B2 * | 12/2018 | Grove | G06N 20/00 |
| 11,775,989 | B1 * | 10/2023 | Hao | G06Q 30/0627 |
| | | | | 705/7.29 |
| 2020/0167669 | A1 * | 5/2020 | Lei | G06N 3/105 |
| 2021/0357440 | A1 * | 11/2021 | Shankaranarayana | |
| | | | | G06F 16/367 |
| 2022/0198295 | A1 * | 6/2022 | Singla | G06N 20/00 |
| 2023/0129390 | A1 * | 4/2023 | Fusco | G06N 5/01 |
| | | | | 706/12 |
| 2023/0289658 | A1 * | 9/2023 | Xie | G06N 3/045 |
| 2024/0098496 | A1 * | 3/2024 | Marzban | H04L 41/16 |
| 2024/0281719 | A1 * | 8/2024 | Duan | G06N 20/20 |
| 2025/0004862 | A1 * | 1/2025 | Rasal | G06N 20/00 |

OTHER PUBLICATIONS

Christoph Körner; Marcel Alsdorf, Mastering Azure Machine Learning: Execute large-scale end-to-end machine learning with Azure, Packt Publishing, 2022. (Abstract Only) (Year: 2022).*

Z. Wen et al., "Orchestrating Networked Machine Learning Applications Using Autosteer," in IEEE Internet Computing, vol. 26, No. 6, pp. 51-58, Nov. 1-Dec. 2022, doi: 10.1109/MIC.2022.3180907. (Year: 2022).*

(Continued)

*Primary Examiner* — Mehmet Yesildag
(74) *Attorney, Agent, or Firm* — Klarquist Sparkman, LLP

(57) ABSTRACT

A computer-implement method can trigger deployment of an intelligence scenario on a tenant computing system. The intelligence scenario includes one or more software artifacts for a machine learning model and predefined metadata of the machine learning model. The method can automatically evaluate application data of the tenant computing system. Responsive to finding that the application data satisfies one or more requirements specified by the metadata, the method can automatically train the machine learning model using the application data and evaluate performance of the machine learning model trained using the application data. Responsive to finding that the performance of the machine learning model meets one or more performance criteria specified by the metadata, the method can automatically activate the machine learning model on the tenant computing system.

16 Claims, 8 Drawing Sheets

(56) References Cited

OTHER PUBLICATIONS

Naman Goel, "Mastering Hugging Face Inference API: Integrating NLP Models for Real-Time Predictions," https://blog/futuresmart.ai/mastering-hugging-face-inference-api-integrating-nlp-models-for-real-time-predictions, 22 pages (accessed Aug. 7, 2023).

Intelligent Scenario Lifecycle Management for SAP S/4HANA, https://community.sap.com/topics/intelligent-scenario-lifecycle-management-s4hana, 5 pages (accessed Aug. 8, 2023).

SAP, "Intelligent Scenario Lifecycle Management (ISLM)," 68 pages (accessed Aug. 8, 2023).

\* cited by examiner

ARTIFICIAL INTELLIGENCE SUPPORT IN ERP SYSTEMS

BACKGROUND

Artificial intelligence (AI) is ubiquitous today. Some enterprise resource planning (ERP) systems, such as S/4HANA provided by SAP SE, of Walldorf, Germany, offer AI solutions to add value to customers. ERP systems allow organizations to use a system of integrated applications to manage their operations and automate many activities. Integration of AI in ERP systems can potentially enhance automation, data analysis, and decision-making. However, adoption of the AI solutions in ERP systems has been very low. Even after adoption, performance of the deployed AI solutions may degrade overtime. Thus, improving AI support for ERP systems is desired.

DETAILED DESCRIPTION

Example 1

Figure 1:
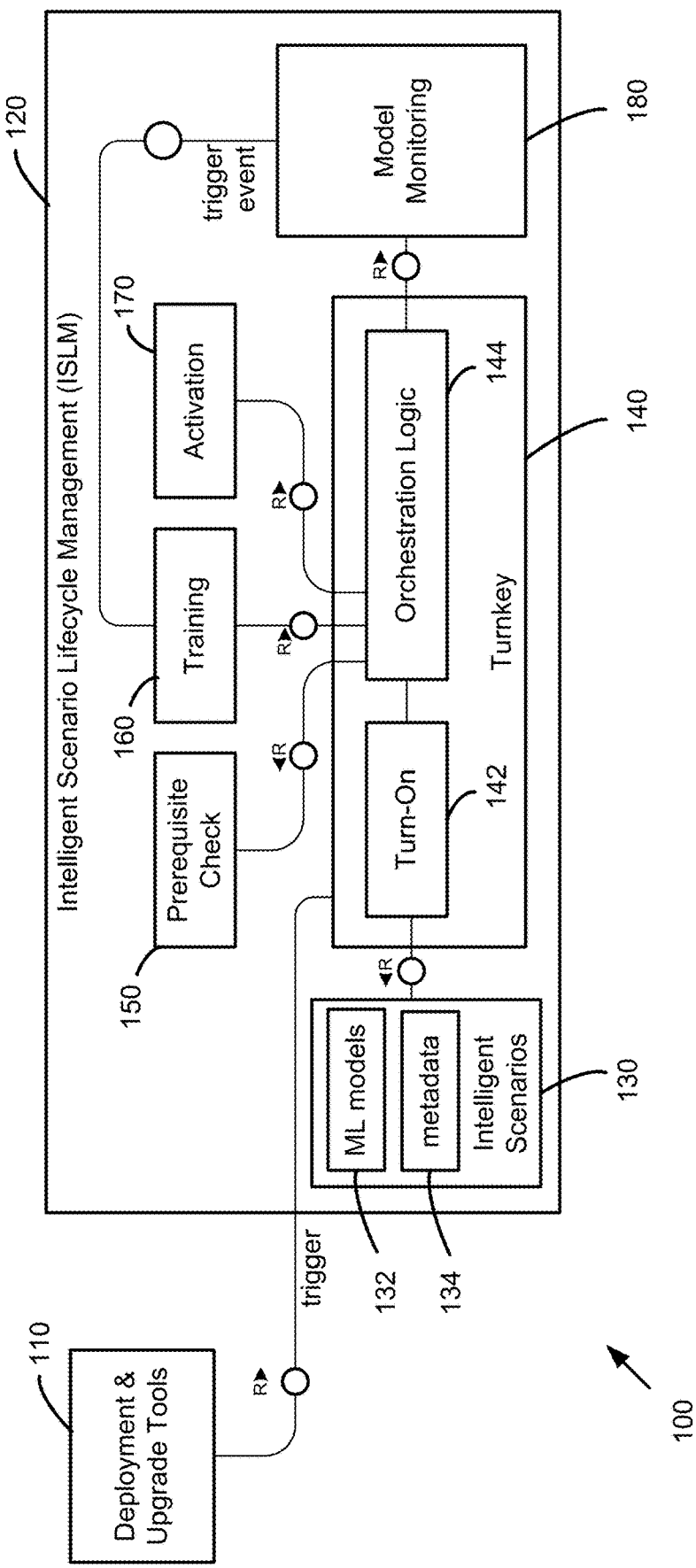
FIG. 1 is an overall block diagram of an example computing system providing improved AI support for ERP systems.

Overview of AI Integration in ERP Systems

Modern ERP systems support multitenancy in a cloud-based computing environment so that one instance of an ERP software and supporting infrastructure can serve multiple user groups, or tenants. Thus, multiple tenants can share the same ERP software and other computing resources running on the same operating system, on the same hardware, with the same data-storage mechanism(s). Even though resources are shared, each tenant can appear to have its own instance of the ERP application and the underlying data of the tenants can be kept separate and secure. For example, a tenant can access a database comprising application data that is specific to the tenant.

Integration of AI in ERP systems can potentially enhance automation, data analysis, and decision-making. Example AI applications in ERP systems include predictive maintenance (e.g., analyze equipment data to predict when maintenance is needed to prevent costly breakdowns and optimize resource utilization), demand forecasting (e.g., analyze historical data and external factors to predict future product demand, aid inventory management and production planning), process optimization (e.g., identify bottlenecks, suggest process improvements to enhance overall efficiency), anomaly detection (e.g., detect unusual patterns that may indicate fraud, errors, or deviations from the norm, and enable timely intervention), and so on.

Despite many potential benefits of AI, adoption of the AI in ERP systems has been very low. Reasons for the low AI adoption rate in existing ERP systems are multifaceted. First, integrating AI functionalities into existing ERP systems requires careful architecture design and integration to prevent disruptions. Second, AI relies on accurate and clean data. Ensuring data consistency across ERP modules and external sources can be challenging.

Importantly, activation of AI functionalities in ERP systems mostly requires a data scientist and/or a complex implementation project on the tenant's side. Skilled AI professionals are in high demand and organizations might struggle to find or afford talent capable of implementing AI solutions. As a result, organizations tend to avoid using the AI functionalities due to the lack of data science resources and/or the high development costs.

Furthermore, after initial integration of AI in ERP systems, ongoing support of the deployed AI in ERP systems poses additional challenges due to shifting data dynamics and the need for continuous model adaptation. As business environments evolve, data patterns change, which can cause performance degradation. As a result, AI models may become less accurate over time without regular updates and retraining. Ensuring data quality and seamless model integration within complex ERP architectures demands sustained efforts. The scarcity of AI expertise and the allocation of resources further complicate maintenance.

The technologies described herein overcome many of the technical challenges described above to provide improved AI support for ERP systems. Specifically, an innovative architecture is developed for seamless integration of AI in ERP systems. Quality of enterprise data used by AI can be automatically checked. Activation of AI solutions in the ERP systems can be automatic or substantially automatic to minimize a user's involvement. As a result, no AI expertise is required to activate the AI solutions. Further, performance of an AI solution can be continuously monitored over its entire lifecycle. Adaptive retraining and/or update of the AI model can be automated so that the AI solution can remain high performing despite shifting data dynamics and/or evolution of business environment over time. As a result, adoption of AI solutions in ERP systems can be improved.

Example 2

Example Computing System with Improved AI Support for ERP Systems

FIG. 1 shows an overall block diagram of an example computing system 100 providing improved AI support for ERP systems.

The computing system 100 includes deployment and upgrade tools 110 and an intelligent scenario lifecycle management (ISLM) framework 120. The deployment and upgrade tools 110 can be used by software developers to develop, test, deploy, and upgrade AI solutions, and the ISLM framework 120 can perform lifecycle management of the AI solutions. The AI solutions are also referred to as intelligent scenarios hereinafter. Both the deployment and upgrade tools 110 and the ISLM framework 120 can be part of an ERP system. The ERP system can support multitenancy so that the ERP software and the intelligent scenarios can be deployed on each tenant's computing system.

As shown in FIG. 1, the ISLM framework 120 can include a plurality of intelligent scenarios 130, a turnkey 140, a prerequisite check unit 150, a training unit 160, an activation unit 170, and a model monitoring unit 180. The turnkey 140 can further include a turn-on unit 142 and an orchestration logic 144.

As described herein, an intelligent scenario 130 is a representation of a machine learning (ML) driven business use case for integration in an ERP system. The intelligent scenarios 130 can be implemented using appropriate programming languages (e.g., the ABAP language developed by SAP) that suits the environment. Each intelligent scenario 130 entails applying ML techniques to address specific business needs while tailoring the solution to the organization's unique requirements. The ML functionality of each intelligent scenario 130 is translated into code, allowing smooth integration and execution within an ERP system, aligning the capabilities of ML with the organization's business objectives. For example, one example intelligent scenario can be configured to perform demand forecasting by using historical sales data and market trends to predict future demand; another example intelligent scenario can be configured to assess supplier performance based on factors like delivery times and quality to make informed sourcing decisions; and so on.

The deployment and upgrade tools 110 can be used by AI developers to develop, test, deploy, and upgrade any of the intelligent scenarios 130. Each intelligent scenario 130 can include a ML model 132 and metadata 134 corresponding to the ML model 132. The ML model 132 can be represented by one or more software artifacts configured to implement a specific ML-driven business use case. The metadata can include information about data source for the ML model 132, training algorithm for the ML model 132, and methods for utilizing the ML model 132.

Before the initial deployment of an intelligent scenario 130 on a tenant computing system, the intelligent scenario 130 can be tested extensively by a data scientist or an AI engineer using as many and as representative datasets as possible. However, datasets used for such testing are usually limited and may not be representative of tenant's application data. This is because the diversity of tenants' business domains and operational practices can lead to unique data patterns, making it challenging to capture all variations in shared testing datasets. Additionally, tenant-specific data might be sensitive or confidential, limiting its availability for testing purposes. Furthermore, the dynamic nature of multi-tenant systems, where tenants join or leave, can make it difficult to maintain a comprehensive dataset. As a result, while testing datasets can provide a general sense of model performance, they may not fully mirror the complexities and nuances of each tenant's unique application environment. Thus, the ML model 132 in the initially deployed intelligent scenario 130 can be deemed as a generic model blueprint, which needs to be further trained using tenant-specific application data before activating the ML model 132 for practical usage by a tenant.

In some examples, the metadata 134 contained in an intelligent scenario 130 can include one or more database views of application data for a specific tenant. Such views represent data source for the corresponding ML model 132. Thus, using the views, tenant-specific application data can be used as input to train and/or utilize the ML model 132. For instance, tenant-specific application data can be used to define input and output (e.g., features and labels) of the ML model 132 for model training purposes. In some examples, the metadata 134 can also identify an algorithm (e.g., Random Forest, XGBoost, etc.) that can be used for training the ML model 132. In some examples, the metadata 134 can further include one or more inference application programming interfaces (APIs) which serve as interfaces to utilize or run the ML model 132 for making predictions on newly generated application data of the tenant. For example, the inference APIs allow the ERP software to send new data of the tenant to the pre-trained ML model 132, which then processes the new data and returns the ML model's predictions or classifications. Additionally, the metadata 134 can include predefined requirements for the application data and/or performance criteria for the ML model 132 that can be used by the orchestration logic 144, as described further below.

After an intelligent scenario has been developed and tested using the deployment and upgrade tools 110, the AI developer can trigger deployment of the intelligent scenario by sending instructions through the turn-on unit 142. The turn-on unit 142 can have a user interface, through which the developer can specify or mark which of the intelligent scenarios 130 are to be deployed and which ones are not (e.g., via checkboxes or the like). For each intelligent scenario 130 that will be deployed, the developer can also specify corresponding metadata 134 through the user interface of the turn-on unit 142. For example, the developer can specify views of application data on a tenant computer system (i.e., tenant-specific data source), a particular algorithm for training the corresponding ML model 132, and inference APIs for utilizing the ML model 132. In some examples, the turn-on unit 142 can have Representational State Transfer Application Programming Interfaces (REST APIs), using which the provider can trigger deployment of selected intelligent scenarios 130 and specify corresponding metadata 134.

In some examples, the deployment of intelligent scenarios 130 not only can be on-demand (e.g., during the initial deployment), but also can be scheduled to update the previously deployed intelligent scenarios (e.g., as part of regular ERP system upgrade). For instance, the ISLM framework 120 can be configured to listen to deployment/upgrade events from the deployment and upgrade tools 110 and run the automated activation/upgrade of selected intelligent scenarios 130 by its own.

The orchestration logic 144 can be configured to orchestrate a sequence of tasks before an intelligent scenario 130 that was triggered for deployment can be activated or enabled for production use in the tenant computing system. The sequence of tasks can check or validate if preconditions to use the intelligent scenario 130 in a concrete tenant computing environment are satisfied.

In one aspect, the orchestration logic 144 can trigger prerequisite checks performed by the prerequisite check unit 150, which can automatically evaluate, in runtime, application data of the tenant computing system to determine if the application data satisfies one or more requirements specified by the metadata 134. As an example, one prerequisite check can be a check to determine if there is sufficient data available for training of the ML model 132. Specifically, the prerequisite check unit 150 can determine if an amount of data records in the application data of tenant computing system exceeds a predefined threshold (which defines a minimum number of data records required to train the ML model 132) specified in the metadata 134. As another example, one prerequisite check can be a check to determine if a distribution of the application data is suitable for training the ML model 132. For instance, one or more statistical parameters (e.g., skewness, kurtosis, mean, standard deviation, range, percentile, etc.) characterizing distribution of the tenant's application data can be determined and compared with predefined statistical requirements specified in the metadata 134. If any of the prerequisite checks does not pass, the intelligent scenario 130 that was triggered for deployment will not be activated (i.e., disabled) on tenant computing system because the tenant-specific application data is deemed to be insufficient (e.g., in quantity and/or quality) to train the corresponding ML model 132.

On the other hand, if all prerequisite checks are successfully completed, the orchestration logic 144 can automatically trigger training of the ML model 132 in runtime. Specifically, the training unit 160 can use tenant's application data to train the ML model 132 so as to transform the ML model 132 from the generic model blueprint to a tenant-specific ML model that is suitable for the tenant's unique computing environment. In some examples, the orchestration logic 144 can automatically evaluate, in runtime, performance of the ML model 132 trained using the tenant's application data, and determine if the performance of the ML model 132 meets one or more performance criteria specified by the metadata 134.

The performance of the ML model 132 can be measured using various metrics (also referred to as key performance indices, or KPIs), depending on the type of ML model 132 and the problem it is trying to solve. For example, for a classification model, the performance can be measured using metrics such as accuracy, precision, recall, F1 score, etc. For a regression model, the performance metrics can include mean squared error, root mean squared error, R-squared, etc. For a clustering model, the performance metrics can include silhouette score, Davies-Bouldin index, etc.

In ERP systems, intelligent scenarios 130 are usually developed for prediction purposes (e.g., predicting sales, predicting product demand, predicting inventory level, etc.). For such use cases, the performance of the ML model 132 can be measured by predictive power and prediction confidence. The predictive power measures the ability of the ML model 132 to predict the values of the target variable using input variables present in the input dataset. An example metric for predictive power is prediction accuracy, which measures the proportion of correctly predicted instances to the total number of instances. The prediction confidence indicates the robustness of the ML model 132 to achieve the same performance when it is applied to a new dataset. An example metric for predictive confidence is probability score, which estimates the likelihood or probability that the predicted instances will occur.

If the performance of the ML model 132 meets all predefined performance criteria, the orchestration logic 144 can automatically trigger activation of the intelligent scenario 130 (and the corresponding ML model 132) on the tenant computing system. Activation of the intelligent scenario 130 (and the ML model 132) can be performed by the activation unit 170 in runtime. On the other hand, if the performance of the ML model 132 fails any of the predefined performance criteria, the intelligent scenario 130 that was triggered for deployment will not be activated (i.e., disabled) on tenant computing system. For example, the metadata 134 can specify a minimum prediction power and a minimum prediction confidence. To activate the intelligent scenarios 130, the predictive power and prediction confidence of the ML model 132 trained using the tenant's application data must exceed the specified minimum prediction power and minimum prediction confidence, respectively.

Thus, the turnkey 140, by integrating the turn-on unit 142 and the orchestration logic 144, represents a software solution for auto-enablement of selected intelligent scenarios 130. Such a software solution is fully developed, configured, and ready for immediate use by a tenant user, requiring minimal setup or customization before it can be put into operation. Thus, no AI expertise is required to activate or enable the intelligent scenarios 130 on tenant computing systems.

After an intelligent scenario is activated, the corresponding AI use case can be productively used, that is, the ML model 132 (properly trained using the tenant-specific application data) can be utilized for inference calls (through the inference APIs) and the model generated results can be incorporated in the business processes and user interfaces.

In some cases, after initial activation of an intelligent scenario 130 in the tenant computing system, the performance of the intelligent scenario 130 can degrade overtime, e.g., due to changing data dynamics and/or concept drift. As the ERP system operates in a dynamic environment, data patterns and distributions can shift over time, causing the ML model 132 to become outdated. Concept drift, where the relationship between the input (e.g., features) and target output (e.g., labels) evolves, can also lead to inaccurate predictions.

To counter degradation, the model monitoring unit 180 can be configured to continuously monitor, in runtime, the performance of the ML model 132 and automatically trigger updates of the ML model 132 when certain trigger conditions are met. Continuous performance monitoring of the ML model 132 can be based on newly generated application data of the tenant computing system, while using the same performance metrics described above (e.g., predictive power, prediction confidence, etc.). After detecting degradation of the performance of the ML model 132 (e.g., if the decrease of predictive power and/or prediction confidence exceeds a predefined limit), the model monitoring unit 180 can automatically trigger, in runtime, retraining of the ML model 132 using the newly generated application data. In one example, degradation of the model performance can be detected based on feedback from tenant users of the intelligent scenarios. Such feedback can be explicit or implicit, as described further below. As another example, the model monitoring unit 180 can monitor, in runtime, characteristics of newly generated application data of the tenant computing system. Example characteristics can include one or more statistical parameters (e.g., skewness, kurtosis, mean, standard deviation, range, percentile, etc.) characterizing distribution of the application data. Responsive to detecting the characteristics of newly generated application data differ from characteristics of the application data previously used in training the ML model 132, the model monitoring unit 180 can automatically trigger, in runtime, retraining of the ML model 132 using the newly generated application data.

In some examples, retraining of the ML model 132 can be conditioned on successful prerequisite checks (e.g., performed by the prerequisite check unit 150) of the application data to ensure that the data quality (e.g., statistical distribution of the newly generated application data) is satisfactory.

Retraining of the ML model 132 can be performed by the training unit 160 and similarly coordinated by the orchestration logic 144. If the retraining is successful (e.g., the performance metrics of the retrained ML model are deemed satisfactory), the retrained ML model 132 can be activated by the activation unit 170. Otherwise, the previously activated intelligent scenario 130 can be deactivated or disabled, and a warning about such deactivation can be issued on the tenant computing system.

In practice, the systems shown herein, such as the computing system 100, can vary in complexity, with additional functionality, more complex components, and the like. For example, there can be additional functionality within the ISLM framework 120. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the intelligence scenarios, the ML model, the meta data, the orchestration logic, the performance metrics, and the like can be stored in one or more computer-readable storage media or computer-readable storage devices. The technologies described herein can be generic to the specifics of operating systems or hardware and can be applied in any variety of environments to take advantage of the described features.

Example 3

Figure 2:
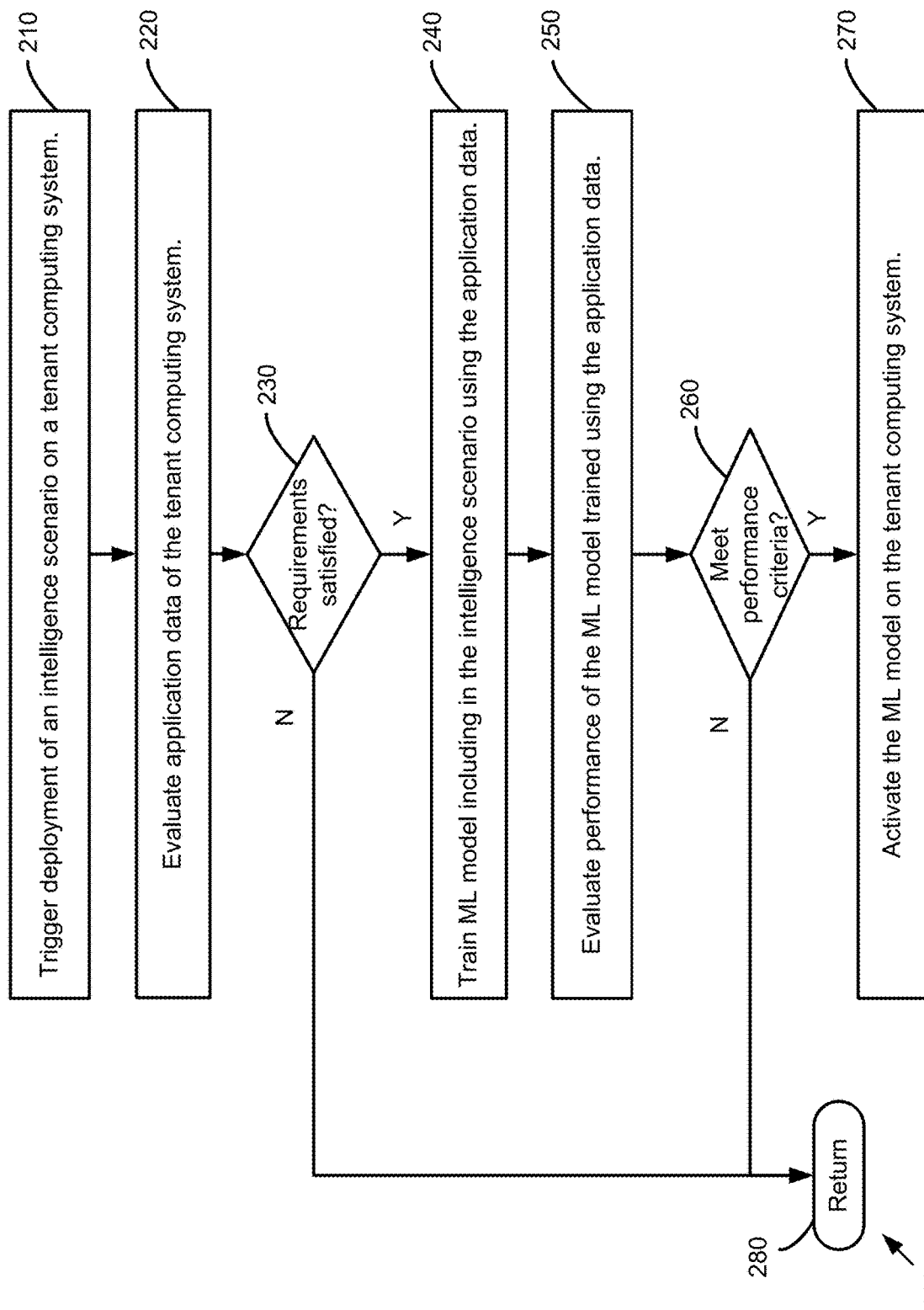
FIG. 2 is a flowchart illustrating an example overall method for implementing auto-enablement of intelligent scenarios.

Example Overall Method for Implementing Auto-Enablement of Intelligent Scenarios FIG. 2 is a flowchart illustrating an example overall method 200 for implementing auto-enablement of intelligent scenarios. The method 200 can be performed, e.g., by the computing system 100 of FIG. 1.

At step 210, a trigger can be sent (e.g., by the deployment and upgrade tools 110) to deploy an intelligence scenario on a tenant computing system running an ERP software. As described above, the intelligence scenario can include one or more software artifacts for a ML model and predefined metadata (e.g., views of application data, algorithm for model training, inference APIs, etc.) of the ML model. The trigger can be received by the turn-on unit 142 and metadata can also be specified via a user interface of the turn-on unit 142.

At step 220, application data of the tenant computing system can be automatically evaluated in runtime, e.g., by the prerequisite check unit 150 (and coordinated by the orchestration logic 144).

A condition check can be performed at step 230 to determine if the application data satisfy certain requirements (e.g., requirements on data quantity and/or quality) specified in the metadata. If any of the requirements is not met, the method can return at 280 without enabling the intelligent scenario.

On the other hand, if the applicant data satisfies all requirements, the method 200 can proceed to step 240, where the ML model can be automatically trained (in runtime) using the application data. Training of the ML model can be performed, e.g., by the training unit 160 (and coordinated by the orchestration logic 144).

At step 250, performance of the ML model trained using the application data can be automatically evaluated in runtime (e.g., by the orchestration logic 144).

Another condition check can be performed at step 260 to determine if the performance of the ML model meets one or more performance criteria specified by the metadata. If any of the performance criteria is not met, the method can return at 280 without enabling the intelligent scenario.

On the other hand, if all performance criteria are met, the method 200 can proceed to step 270 to activate the ML model. As a result, the intelligent scenario is enabled or activated on the tenant computing system.

As described above, in some cases, the method 200 can also continuously monitor performance of the ML model (after its initial activation) based on newly generated application data of the tenant computing system. Responsive to detecting degradation of the performance of the ML model, the method 200 can automatically trigger retraining of the ML model using the newly generated application data.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example 4

Example Implementation of Orchestration Logic

Figure 3:
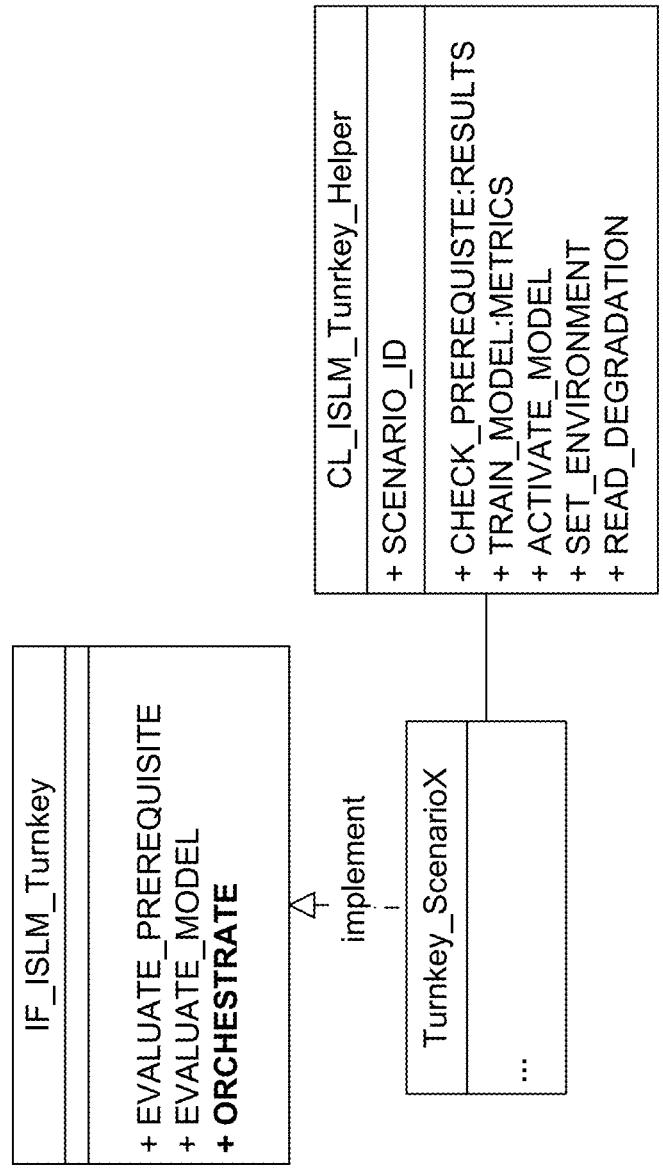
FIG. 3 depicts an example ABAP class implementation of an orchestration logic shown in FIG. 1.

As described above, the orchestration logic 144 can orchestrate a sequence of tasks to validate if preconditions to use an intelligent scenario are satisfied before enabling the intelligent scenario. The orchestration logic 144 can be implemented as a software artifact. For example, FIG. 3 depicts an example ABAP class 300 which implements an ABAP interface for enabling intelligent scenarios on a tenant computing system. The ABAP class 300 provides a uniform structure and interface for auto-enablement and lifecycle management of any intelligent scenarios, each of which can have a unique identifier (SCENARIO_ID).

In the depicted example, the main method of the class 300 is ORCHESTRATE, which coordinates the other methods, evaluates their results, and logs all activities. The first step in the orchestration process is to evaluate the prerequisite checks by calling the method EVALUATE_PREREQUISITE, which uses a helper method CHECK_PREREQUISTE to invoke prerequisite checks that are specific to the underlying intelligent scenario. The prerequisite checks can evaluate quantity and/or quality of the tenant-specific application data. The success or failure conditions for the prerequisite checks can be coded into the method. If the prerequisite checks are not successful, the intelligent scenario cannot be activated or enabled automatically. Warnings or notifications can be provided to an administrator of the tenant computing system.

If the prerequisite checks are successful, the next step is to evaluate the ML model by calling the method EVALUATE_MODEL. This method triggers training of the ML model using a helper method called TRAIN_MODEL and evaluates the training results. The training job can measure performance metrics (e.g., predictive power, prediction confidence, etc.) which can be interpreted by the EVALUATE_MODEL method to decide on the next step. The success or failure criteria for these performance metrics can be coded into the method to enable automation.

If the trained ML model has satisfactory performance metrics (e.g., with both high predictive accuracy and high prediction confidence), then the intelligent scenario can be activated for production use on the tenant computing system by calling the method ACTIVATE_MODEL.

Thus, the example ABAP class 300 can ensure that intelligent scenarios can be activated on tenant computing systems if and only if the tenant-specific application data is suitable to train the ML model and the model training results in satisfactory performance.

Generally, there are two approaches for integrating ML capabilities into an ERP system. In the first approach, known as embedded scenarios, the ERP system runs in the same stack as its ML provider, which includes analytics libraries for developing predictive modeling processes and advanced analytics algorithms. This approach can be used to solve use cases which do not have a high demand of computing resources (e.g., forecasting, trending, etc.). In the second approach, known as side-by-side scenarios, the ERP system runs in a separate stack from its ML provider (e.g., the SAP S/4HANA can run a ML solution provided on Amazon Web Services). This approach allows for the use of remote ML services for high-end use cases such as image recognition, sentimental analysis, and deep learning for natural language processing based on neural networks. These services can include capabilities such as intercompany reconciliation, document information extraction, data attribute recommendation, and business entity recognition, which may have a high demand of computing resources.

The example ABAP class 300 can be configured to support both embedded scenarios and side-by-side scenarios. For embedded scenarios, the ABAP class 300 can implement the above prerequisite checks and model evaluation within the ERP system and no additional settings are required. For side-by-side scenarios, additional setup may be necessary in order to use the ML services provided by an external party different from the provider of the ERP system. In such cases, the ML model is operated by a remote computing system that is independent of the ERP system or software. To use the ML services, the ABAP class 300 can call the method SET_ENVIRONMENT to set environment configurations of the ML model. For example, the method can configure connectivity between the tenant computing system and the remote computing system. The method can also specify computing resources needed from the remote computing system (e.g., required CPU, GPU, and/or memory resources) to accommodate the anticipated workload and complexity of the ML model. Other environmental configurations (e.g., data replication, data transfer protocols, data privacy and security controls, etc.) can also be established.

Additionally, the example ABAP class 300 can be configured to receive feedback and/or model monitoring results by calling the method READ_DEGRADATION. This method can evaluate whether a previously activated ML model has a performance degradation, and if so, trigger retraining of the ML model, as described above.

Example 5

Example Design Activities Before Deploying Intelligent Scenarios

Figure 4:
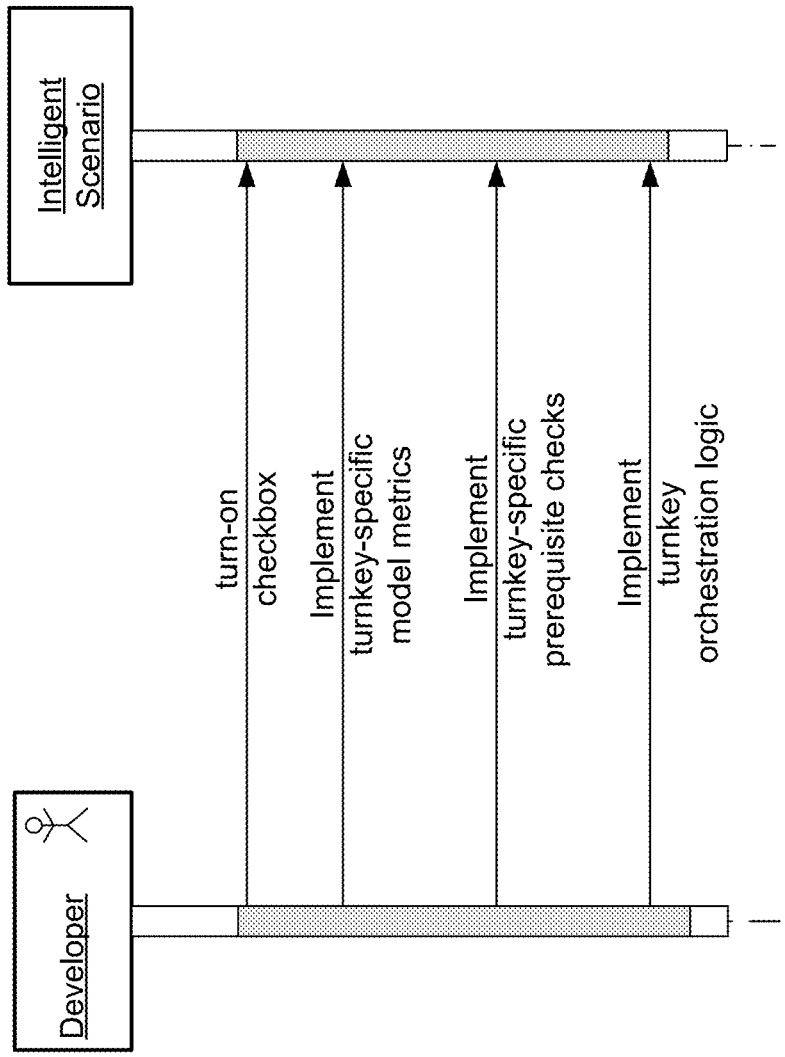
FIG. 4 is a sequence diagram illustrating example activities involved before deploying an intelligent scenario.

FIG. 4 is a sequence diagram 400 illustrating example design activities that may occur before deploying an intelligent scenario on tenant computing system.

During the design phase, AI developers can model and implement necessary artifacts (e.g., including the ML model and corresponding metadata) to enable a specific intelligent scenario for automated activation or auto-enablement. Design activities before deploying a selected intelligent scenario can be implemented through a turnkey (e.g., the turnkey 140) which represents a software solution for auto-enablement of the selected intelligent scenario.

For example, the developers can mark an intelligent scenario (out of a plurality of candidate intelligent scenarios) as qualified for auto-enablement in the user interface of the turn-on unit 142 by checking a corresponding checkbox. The intelligent scenario which is marked as qualified for auto-enablement requires development activities to provide the necessitated AI capabilities. Typically, a close collaboration between the developers and the data scientists of the use case is needed. For example, data scientists can suggest turnkey-specific prerequisite checks and model metrics, which are then implemented by the developers. The turnkey-specific prerequisite checks can define one or more requirements (e.g., part of metadata 134) for the application data of the tenant computing system. The turnkey-specific model metrics can define one or more performance criteria (e.g., part of metadata 134) for the ML model. Additionally, the developers can implement turnkey-specific orchestration logic (e.g., the orchestration logic 144), which is responsible for evaluating whether the selected intelligent scenario can be activated automatically or not. As described above, such orchestration logic can be represented as an ABAP class, which can be registered to the selected intelligent scenario.

Example 6

Example Process of Lifecycle Management of Intelligent Scenarios

Figure 5:
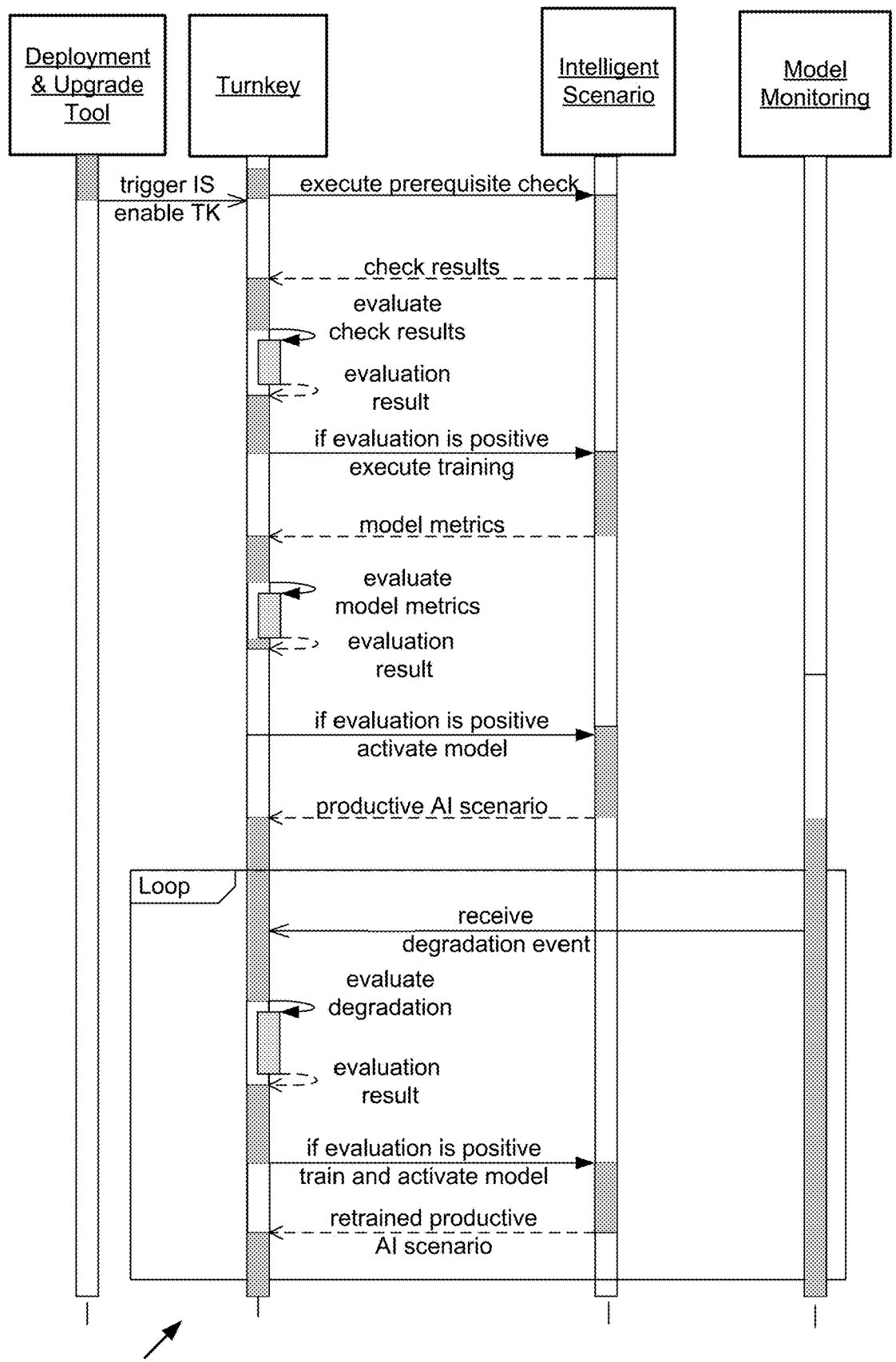
FIG. 5 is a sequence diagram illustrating example activities involved in lifecycle management of an intelligent scenario.

FIG. 5 is a sequence diagram illustrating example activities and runtime behavior 500 involved in lifecycle management of an intelligent scenario.

During initial deployment and/or regular updates of an intelligent scenario, the development and upgrade tool can trigger auto-enablement of the intelligent scenario (denoted as IS, e.g., by checking a corresponding checkbox) and implement prerequisite checks, model metrics, and orchestration logics to enable the turnkey (denoted as TK) that is specific to the intelligent scenario, as described above.

The turnkey, or more specifically, the orchestration logic can trigger execution of prerequisite checks of tenant application data and evaluates the results against predefined requirements. If the evaluation is positive (thus indicating the tenant application data is sufficient for model training), training of the ML model (defined by the intelligent scenario) is triggered, and the generated model metrics are evaluated against predefined performance criteria. If the evaluation is positive, the trained ML model is activated for productive usage on tenant computing system.

As the data environment changes over time, the performance of the ML model may degrade, requiring regular retraining. Determining when to retrain a model can be handled by the model monitoring unit, which can generate trigger events indicating that retraining is required for a ML model. The orchestration logic can catch the trigger events and repeat the steps of running prerequisite checks, ML model training, and activation depending on the evaluation results of the prerequisite checks and model training. In a positive case, the ML model is retrained and the intelligent scenario including the updated ML model is activated for productive usage on tenant computing system.

Example 7

Example Architecture for Lifecycle Management of Intelligent Scenarios

Figure 6:
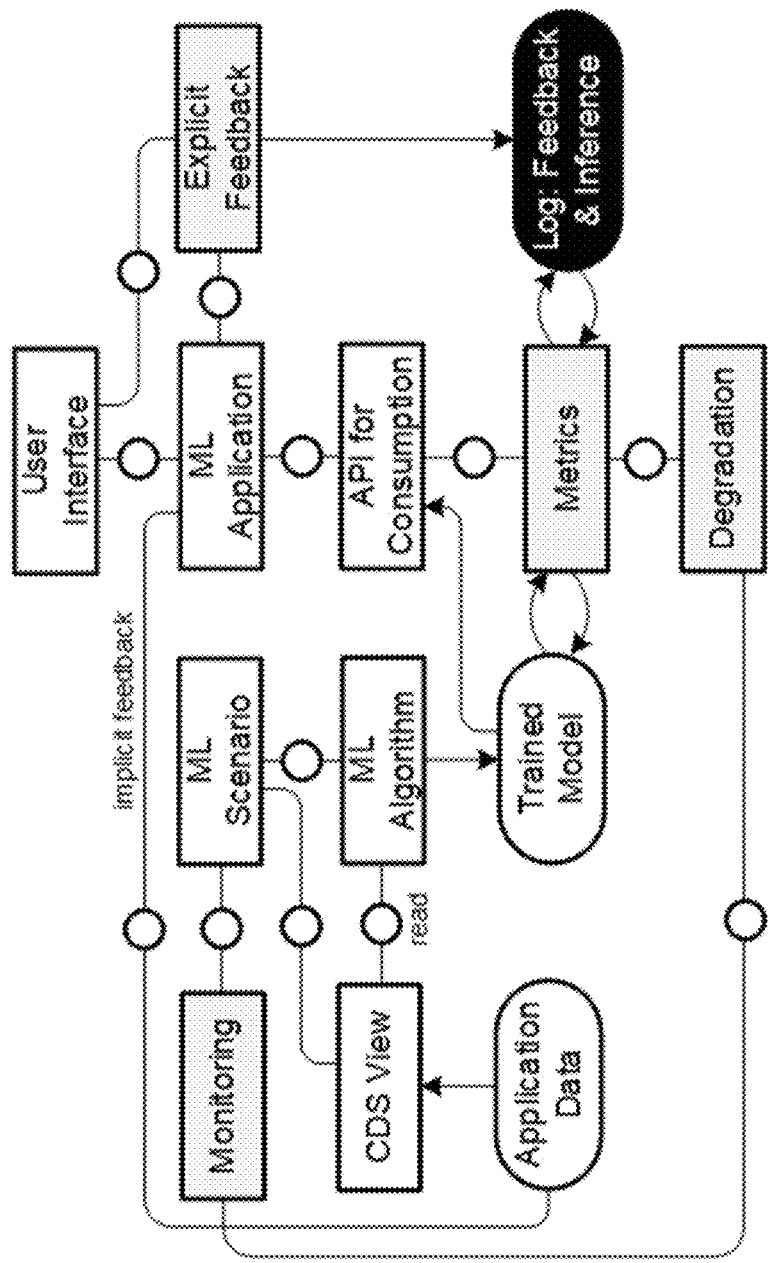
FIG. 6 is a block diagram illustrating an example architecture for lifecycle management for an intelligent scenario.

FIG. 6 is a block diagram illustrating an example architecture 600 for lifecycle management for an intelligent scenario.

An intelligent scenario (denoted as ML scenario) is a design-time entity that contains all the required development objects for an AI use case (denoted as ML application). The intelligent scenario includes a ML model (implementing a specific ML algorithm) and views for training the ML model. In some examples, the views can be core data service (CDS) views defined in SAP S/4HANA, which can provide a standardized and efficient way to define and consume data models. For example, CDS views can be used to define structured data models that combine data from various sources, such as database tables, other CDS views, and external sources. The CDS views can be defined on top of application data tables to represent the semantic data model of the ERP system. The CDS views can hide the cryptic database models and wrap them into human-understandable entities, containing domain-specific metadata or annotations.

For each ML application, a specific CDS view for model training can be provided. The ML algorithm can read the application data during the training process, and the trained ML model can be stored in a database system. The trained model can then be wrapped with inference APIs for consumption, allowing ML capabilities to be integrated into the tenant's user interfaces and the ERP software.

During the model training process, performance metrics (e.g., predictive accuracy, etc.) can be calculates. In some examples, the application data can be divided into a training data set and a validation data. The training data set can be used for model training and the validation data set can be used to measure the performance of the trained model.

After initial activation of the intelligent scenario, model degradation can be detected based on tenant users' feedback or based on continuous evaluation of the performance metrics of the ML model while processing new application data. Tenant user's feedback and inference of performance degradation can be logged for further analysis. Detection of model degradation can trigger retraining of the ML model using the new application data. Additionally, characteristics or distribution change of the application data (e.g., data drifting, skewness change, etc.) can also be detected and trigger retaining of the ML model.

Feedback from tenant users can be explicit and/or implicit. Explicit feedback can be derived from direct interaction with the tenant users, for example, through ranking, voting, flagging, polling, and/or commenting on output generated by the ML model. Explicit feedback can be provided in the middle of workflow (e.g., immediately after receiving the ML model output), or delayed (e.g., the user can provide feedback at chosen time). Implicit feedback can be derived by observing the tenant user's activities, including navigation paths, search queries, and business processes related interactions. For example, instances where results of the ML model are overridden by tenant users (e.g., changing ML prediction or classification results) can be detected and serve as implicit feedback indicating potential performance degradation of the ML model. Implicit feedback can be more representative than explicit feedback because it is based on what tenant user's actions and behaviors. Implicit feedback can be gathered in the background without disrupting tenant users' workflow. In some examples, implicit feedback can be stored as part of the application data.

Example 8

Example Advantages

A number of advantages can be achieved via the technologies described herein.

First, the ISLM framework described herein allows seamless integration of AI functionalities into existing ERP systems. Specifically, software implementation of turnkey (including turn-on unit and orchestration logic) in combination with intelligent scenarios can abstract the underlying ML models and various activities for automatic activation of corresponding ML models on a tenant computing system.

Second, the ISLM framework described herein can use tenant-specific application data to train ML models in respective intelligent scenarios, thereby transforming generic model blueprints to tenant-specific ML models that are suitable for the tenant's unique computing environment. In the process, the ISLM framework not only can automatically assess tenant's application data to ensure it has sufficient quantity and quality for model training, but also can automatically evaluate performance of the trained ML model and activate the ML model if the performance is deemed satisfactory. Such functionalities can reduce the need for data scientists and/or complex implementation projects on the tenant's side and make it easier and more cost-effective for organizations to implement and use AI solutions in their ERP systems, without having to rely on scarce and expensive AI resources.

Third, the ISLM framework described herein allows ongoing support for intelligent scenarios in ERP systems. By continuously monitoring performance of the activated ML models, the ISLM framework can handle shifting data dynamics and the need for continuous model adaptation. This would enable ML models to maintain their accuracy over time, even as business environments evolve and/or data patterns change. The solution would also reduce the need for sustained maintenance efforts and make it easier and more cost-effective for organizations to maintain their AI deployments in ERP systems.

Overall, the technologies described herein can improve adoption of AI solutions in ERP systems. By streamlining the deployment and management of intelligent scenarios throughout their lifecycle, the technologies described herein enable organizations to benefit from the advantages of AI in ERP systems in a more efficient and cost-effective way.

Example 9

Example Computing Systems

Figure 7:
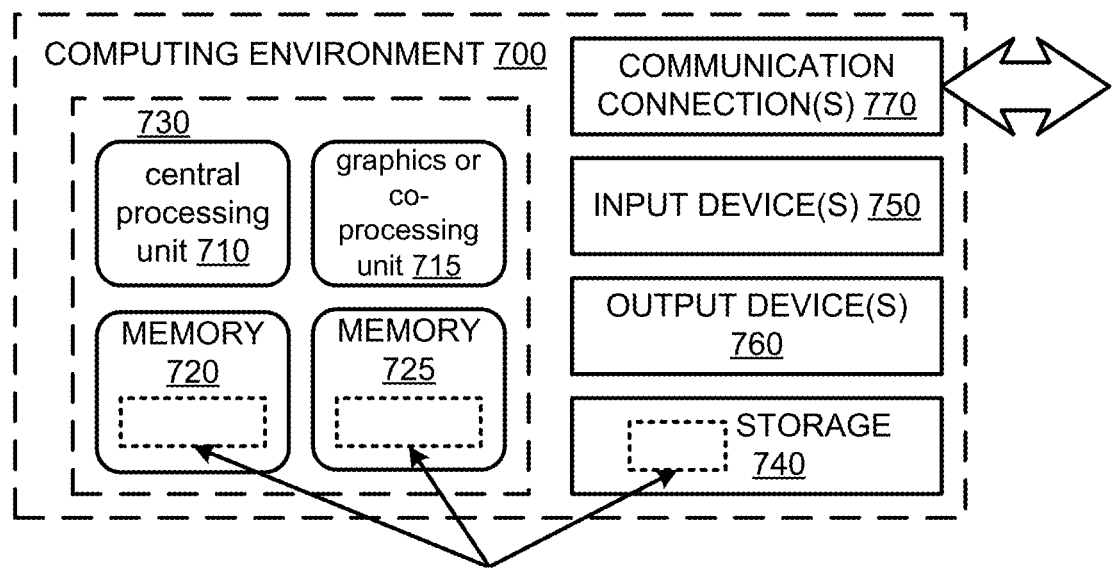
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 can store software 780 implementing one or more innovations described herein, in the form of computer-executable instructions suitable for execution by the processing unit(s) 710, 715.

A computing system 700 can have additional features. For example, the computing system 700 can include storage 740, one or more input devices 750, one or more output devices 760, and one or more communication connections 770, including input devices, output devices, and communication connections for interacting with a user. An interconnection mechanism (not shown) such as a bus, controller, or network can interconnect the components of the computing system 700. Typically, operating system software (not shown) can provide an operating environment for other software executing in the computing system 700, and coordinate activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 can store instructions for the software implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 10

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 11

Example Cloud Computing Environment

Figure 8:
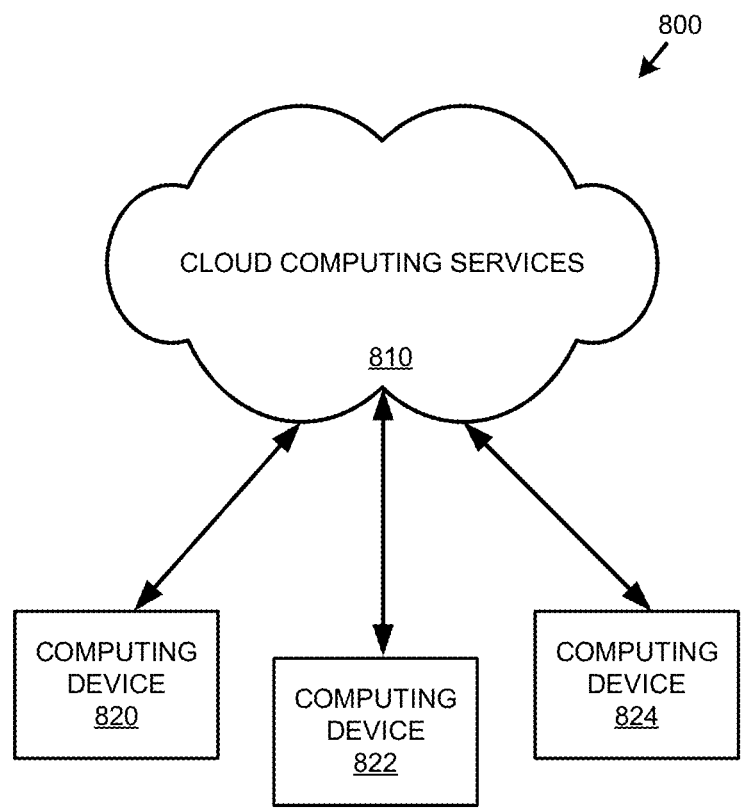
FIG. 8 is a block diagram of an example cloud computing environment that can be used in conjunction with the technologies described herein.

FIG. 8 depicts an example cloud computing environment 800 in which the described technologies can be implemented, including, e.g., the system 100 and other systems herein. The cloud computing environment 800 can include cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 can be utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 12

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example 13

Example Embodiments

Any of the following example clauses can be implemented.

Clause 1. A computer-implemented method for improved artificial intelligence support in an enterprise resource planning (ERP) system, the method comprising: triggering deployment of an intelligence scenario on a tenant computing system running an ERP software, wherein the intelligence scenario comprises one or more software artifacts for a machine learning model and predefined metadata of the machine learning model; automatically evaluating, in runtime, application data of the tenant computing system; responsive to finding that the application data satisfies one or more requirements specified by the metadata, automatically training, in runtime, the machine learning model using the application data; automatically evaluating, in runtime, performance of the machine learning model trained using the application data; and responsive to finding that the performance of the machine learning model meets one or more performance criteria specified by the metadata, automatically activating, in runtime, the machine learning model on the tenant computing system.

Clause 2. The method of clause 1, wherein the metadata comprises one or more views of the application data and one or more inference application programming interfaces of the machine learning model.

Clause 3. The method of any one of clauses 1-2, wherein automatically evaluating, in runtime, application data comprises determining an amount of data records in the application data, wherein at least one of the requirements specified by the metadata defines a minimum number of data records required to train the machine learning model.

Clause 4. The method of any one of clauses 1-3, wherein automatically evaluating, in runtime, application data comprises determining a distribution of the application data, wherein at least one of the requirements specified by the metadata defines a statistical requirement of the distribution to train the machine learning model.

Clause 5. The method of any one of clauses 1-4, wherein automatically evaluating, in runtime, performance of the machine learning model comprises measuring prediction power of the machine learning model, wherein at least one of the performance criteria specified by the metadata defines a minimum prediction power to activate the machine learning model.

Clause 6. The method of any one of clauses 1-5, wherein automatically evaluating, in runtime, performance of the machine learning model comprises measuring prediction confidence of the machine learning model, wherein at least one of the performance criteria specified by the metadata defines a minimum prediction confidence to activate the machine learning model.

Clause 7. The method of any one of clauses 1-6, further comprising: monitoring, in runtime, performance of the machine learning model based on newly generated application data of the tenant computing system; and responsive to detecting degradation of the performance of the machine learning model, automatically triggering, in runtime, retraining of the machine learning model using the newly generated application data.

Clause 8. The method of clause 7, wherein monitoring, in runtime, performance of the machine learning model comprises detecting instances where results of the machine learning model are overridden by users of the tenant computing system.

Clause 9. The method of any one of clauses 1-8, further comprising: monitoring, in runtime, characteristics of newly generated application data of the tenant computing system; and responsive to detecting the characteristics of newly generated application data differ from characteristics of the application data previously used in training the machine learning model, automatically triggering, in runtime, retraining of the machine learning model using the newly generated application data.

Clause 10. The method of any one of clauses 1-9, further comprising setting environment configurations of the machine learning model, wherein the machine learning model is operated on a remote computing system that is independent of the ERP software, wherein setting environment configurations comprises configuring connectivity between the tenant computing system and the remote computing system.

Clause 11. A computing system with improved artificial intelligence support for enterprise resource planning (ERP), the system comprising: memory; one or more hardware processors coupled to the memory; and one or more computer readable storage media storing instructions that, when loaded into the memory, cause the one or more hardware processors to perform operations comprising: triggering deployment of an intelligence scenario on a tenant computing system running an ERP software, wherein the intelligence scenario comprises one or more software artifacts for a machine learning model and predefined metadata of the machine learning model; automatically evaluating, in runtime, application data of the tenant computing system; responsive to finding that the application data satisfies one or more requirements specified by the metadata, automatically training, in runtime, the machine learning model using the application data; automatically evaluating, in runtime, performance of the machine learning model trained using the application data; and responsive to finding that the performance of the machine learning model meets one or more performance criteria specified by the metadata, automatically activating, in runtime, the machine learning model on the tenant computing system.

Clause 12. The system of clause 11, wherein the metadata comprises one or more views of the application data and one or more inference application programming interfaces of the machine learning model.

Clause 13. The system of any one of clauses 11-12, wherein automatically evaluating, in runtime, application data comprises determining an amount of data records in the application data, wherein at least one of the requirements specified by the metadata defines a minimum number of data records required to train the machine learning model.

Clause 14. The system of any one of clauses 11-13, wherein automatically evaluating, in runtime, application data comprises determining a distribution of the application data, wherein at least one of the requirements specified by the metadata defines a statistical requirement of the distribution to train the machine learning model.

Clause 15. The system of any one of clauses 11-14, wherein automatically evaluating, in runtime, performance of the machine learning model comprises measuring prediction power of the machine learning model, wherein at least one of the performance criteria specified by the metadata defines a minimum prediction power to activate the machine learning model.

Clause 16. The system of any one of clauses 11-15, wherein automatically evaluating, in runtime, performance of the machine learning model comprises measuring prediction confidence of the machine learning model, wherein at least one of the performance criteria specified by the metadata defines a minimum prediction confidence to activate the machine learning model.

Clause 17. The system of any one of clauses 11-16, wherein the operations further comprise: monitoring, in runtime, performance of the machine learning model based on newly generated application data of the tenant computing system; and responsive to detecting degradation of the performance of the machine learning model, automatically triggering, in runtime, retraining of the machine learning model using the newly generated application data.

Clause 18. The system of any one of clauses 11-17, wherein the operations further comprise: monitoring, in runtime, characteristics of newly generated application data of the tenant computing system; and responsive to detecting the characteristics of newly generated application data differ from characteristics of the application data previously used in training the machine learning model, automatically triggering, in runtime, retraining of the machine learning model using the newly generated application data.

Clause 19. The system of any one of clauses 11-18, wherein the operations further comprise setting environment configurations of the machine learning model, wherein the machine learning model is operated on a remote computing system that is independent of the ERP software, wherein setting environment configurations comprises configuring connectivity between the tenant computing system and the remote computing system.

Clause 20. One or more non-transitory computer-readable media having encoded thereon computer-executable instructions causing one or more processors to perform a method for improved artificial intelligence support in an enterprise resource planning (ERP) system, the method comprising: triggering deployment of an intelligence scenario on a tenant computing system running an ERP software, wherein the intelligence scenario comprises one or more software artifacts for a machine learning model and predefined metadata of the machine learning model; automatically evaluating, in runtime, application data of the tenant computing system; responsive to finding that the application data satisfies one or more requirements specified by the metadata, automatically training, in runtime, the machine learning model using the application data; automatically evaluating, in runtime, performance of the machine learning model trained using the application data; and responsive to finding that the performance of the machine learning model meets one or more performance criteria specified by the metadata, automatically activating, in runtime, the machine learning model on the tenant computing system, wherein the metadata comprises one or more views of the application data and one or more inference application programming interfaces of the machine learning model.

Example 14

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for improved artificial intelligence support in an enterprise resource planning (ERP) system, the method comprising:
    triggering deployment of an intelligence scenario on a tenant computing system running an ERP software, wherein the intelligence scenario comprises one or more software artifacts for a machine learning model and predefined metadata of the machine learning model;
    automatically evaluating, in runtime, application data of the tenant computing system;
    responsive to finding that the application data satisfies one or more requirements specified by the metadata, automatically training, in runtime, the machine learning model using the application data;
    automatically evaluating, in runtime, performance of the machine learning model trained using the application data;
    responsive to finding that the performance of the machine learning model meets one or more performance criteria specified by the metadata, automatically activating, in runtime, the machine learning model on the tenant computing system;
    monitoring, in runtime, performance of the machine learning model based on newly generated application data of the tenant computing system; and
    responsive to detecting degradation of the performance of the machine learning model, automatically triggering, in runtime, retraining of the machine learning model using the newly generated application data,
    wherein the metadata comprises one or more views of the application data and one or more inference application programming interfaces of the machine learning model.

2. The method of claim 1, wherein automatically evaluating, in runtime, application data comprises determining an amount of data records in the application data, wherein at least one of the requirements specified by the metadata defines a minimum number of data records required to train the machine learning model.

3. The method of claim 1, wherein automatically evaluating, in runtime, application data comprises determining a distribution of the application data, wherein at least one of the requirements specified by the metadata defines a statistical requirement of the distribution to train the machine learning model.

4. The method of claim 1, wherein automatically evaluating, in runtime, performance of the machine learning model comprises measuring prediction power of the machine learning model, wherein at least one of the performance criteria specified by the metadata defines a minimum prediction power to activate the machine learning model.

5. The method of claim 1, wherein automatically evaluating, in runtime, performance of the machine learning model comprises measuring prediction confidence of the machine learning model, wherein at least one of the performance criteria specified by the metadata defines a minimum prediction confidence to activate the machine learning model.

6. The method of claim 1, wherein monitoring, in runtime, performance of the machine learning model comprises detecting instances where results of the machine learning model are overridden by users of the tenant computing system.

7. The method of claim 1, further comprising:
monitoring, in runtime, characteristics of newly generated application data of the tenant computing system; and
responsive to detecting the characteristics of newly generated application data differ from characteristics of the application data previously used in training the machine learning model, automatically triggering, in runtime, retraining of the machine learning model using the newly generated application data.

8. The method of claim 1, further comprising setting environment configurations of the machine learning model, wherein the machine learning model is operated on a remote computing system that is independent of the ERP software, wherein setting environment configurations comprises configuring connectivity between the tenant computing system and the remote computing system.

9. A computing system with improved artificial intelligence support for enterprise resource planning (ERP), the system comprising:
memory;
one or more hardware processors coupled to the memory; and
one or more computer readable storage media storing instructions that, when loaded into the memory, cause the one or more hardware processors to perform operations comprising:
triggering deployment of an intelligence scenario on a tenant computing system running an ERP software, wherein the intelligence scenario comprises one or more software artifacts for a machine learning model and predefined metadata of the machine learning model;
automatically evaluating, in runtime, application data of the tenant computing system;
responsive to finding that the application data satisfies one or more requirements specified by the metadata, automatically training, in runtime, the machine learning model using the application data;
automatically evaluating, in runtime, performance of the machine learning model trained using the application data;
responsive to finding that the performance of the machine learning model meets one or more performance criteria specified by the metadata, automatically activating, in runtime, the machine learning model on the tenant computing system;
monitoring, in runtime, characteristics of newly generated application data of the tenant computing system; and
responsive to detecting the characteristics of newly generated application data differ from characteristics of the application data previously used in training the machine learning model, automatically triggering, in runtime, retraining of the machine learning model using the newly generated application data,
wherein the metadata comprises one or more views of the application data and one or more inference application programming interfaces of the machine learning model.

10. The system of claim 9, wherein automatically evaluating, in runtime, application data comprises determining an amount of data records in the application data, wherein at least one of the requirements specified by the metadata defines a minimum number of data records required to train the machine learning model.

11. The system of claim 9, wherein automatically evaluating, in runtime, application data comprises determining a distribution of the application data, wherein at least one of the requirements specified by the metadata defines a statistical requirement of the distribution to train the machine learning model.

12. The system of claim 9, wherein automatically evaluating, in runtime, performance of the machine learning model comprises measuring prediction power of the machine learning model, wherein at least one of the performance criteria specified by the metadata defines a minimum prediction power to activate the machine learning model.

13. The system of claim 9, wherein automatically evaluating, in runtime, performance of the machine learning model comprises measuring prediction confidence of the machine learning model, wherein at least one of the performance criteria specified by the metadata defines a minimum prediction confidence to activate the machine learning model.

14. The system of claim 9, wherein the operations further comprise:
monitoring, in runtime, performance of the machine learning model based on newly generated application data of the tenant computing system; and
responsive to detecting degradation of the performance of the machine learning model, automatically triggering, in runtime, retraining of the machine learning model using the newly generated application data.

15. The system of claim 9, wherein the operations further comprise setting environment configurations of the machine learning model, wherein the machine learning model is operated on a remote computing system that is independent of the ERP software, wherein setting environment configurations comprises configuring connectivity between the tenant computing system and the remote computing system.

16. One or more non-transitory computer-readable media having encoded thereon computer-executable instructions causing one or more processors to perform a method for improved artificial intelligence support in an enterprise resource planning (ERP) system, the method comprising:
triggering deployment of an intelligence scenario on a tenant computing system running an ERP software, wherein the intelligence scenario comprises one or more software artifacts for a machine learning model and predefined metadata of the machine learning model;

automatically evaluating, in runtime, application data of the tenant computing system;

responsive to finding that the application data satisfies one or more requirements specified by the metadata, automatically training, in runtime, the machine learning model using the application data;

automatically evaluating, in runtime, performance of the machine learning model trained using the application data;

responsive to finding that the performance of the machine learning model meets one or more performance criteria specified by the metadata, automatically activating, in runtime, the machine learning model on the tenant computing system;

monitoring, in runtime, performance of the machine learning model based on newly generated application data of the tenant computing system; and responsive to detecting degradation of the performance of the machine learning model, automatically triggering, in runtime, retraining of the machine learning model using the newly generated application data, wherein the metadata comprises one or more views of the application data and one or more inference application programming interfaces of the machine learning model.

\* \* \* \* \*